United States Patent [19]

Metz

[11] 4,199,999

[45] Apr. 29, 1980

[54] BALL-TYPE MECHANICAL TRANSMISSION

[75] Inventor: Joseph R. Metz, Ridgefield, Conn.

[73] Assignee: Norco, Inc., Ridgefield, Conn.

[21] Appl. No.: 929,195

[22] Filed: Jul. 28, 1978

[51] Int. Cl.² .............................................. F16H 1/18
[52] U.S. Cl. .............................. 74/424.8 NA; 74/89.15
[58] Field of Search ............... 74/424.8 R, 424.8 NA, 74/89.15; 114/155

[56] References Cited

U.S. PATENT DOCUMENTS

| | | | |
|---|---|---|---|
| 975,591 | 11/1910 | Whitney | 74/424.8 NA |
| 1,448,426 | 3/1923 | Altgelt | 74/424.8 R |
| 2,424,492 | 7/1947 | Morris | 74/424.8 R |
| 2,464,873 | 3/1949 | Lear | 74/424.8 R |
| 2,701,478 | 2/1955 | Riess | 74/424.8 R |
| 2,868,030 | 1/1959 | Forwald | 74/424.8 R |
| 2,938,402 | 5/1960 | Willmore | 74/424.8 R |
| 2,966,070 | 12/1960 | Wise | 74/424.8 R |
| 3,111,042 | 11/1963 | Hoover | 74/424.8 R X |
| 3,206,994 | 9/1965 | Angsten | 74/424.8 R |
| 4,000,661 | 1/1977 | Menzel | 74/424.8 R X |

FOREIGN PATENT DOCUMENTS

| | | | |
|---|---|---|---|
| 1930399 | 1/1970 | Fed. Rep. of Germany | 74/424.8 R |
| 2,007,380 | 8/1970 | Fed. Rep. of Germany | 74/424.8 R |

Primary Examiner—J. Franklin Foss

Attorney, Agent, or Firm—H. Gibner Lehmann; K. Gibner Lehmann

[57] ABSTRACT

A low-friction, light-load, low-cost mechanical transmission for converting rotary motion to linear motion, comprising an elongate screw shaft having a rolled thread groove, a multi-part follower nut comprising a sleeve having a through hole constituting a ball socket and a cylindrical jacket encircling the sleeve, there being a thread-engaging ball disposed in the socket and engaging the walls of the thread groove. The bore of the jacket has a hard surface which engages and provides a back-up for the ball as the latter traverses the length of the screw shaft. The sleeve is held captive within the jacket by a pair of locking rings received in annular grooves in the bore of the latter. Surrounding the nut is a tubular housing. Anti-friction sleeve bearings on the exterior of the jacket slidably engage the inner surface of the housing to enable the nut to move freely therein as the screw shaft is rotatably driven. A tubular connector member is telescopically received in the housing and is immovably secured to the jacket by one of the locking rings which hold the sleeve and jacket assembled. An additional bearing between the housing and connector member maintains the latter centralized, thereby eliminating binding or seizing. It is particularly adapted for light-to-moderate load applications, including a conversion in the steering mechanism of boats, between the turning movement of the wheel and the reciprocative movement of the rudder.

24 Claims, 10 Drawing Figures

U.S. Patent  Apr. 29, 1980  Sheet 1 of 2  4,199,999
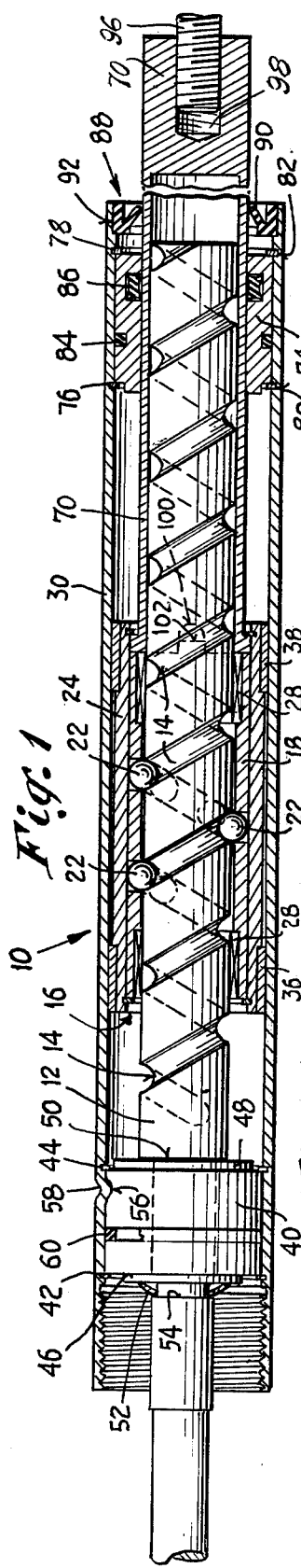
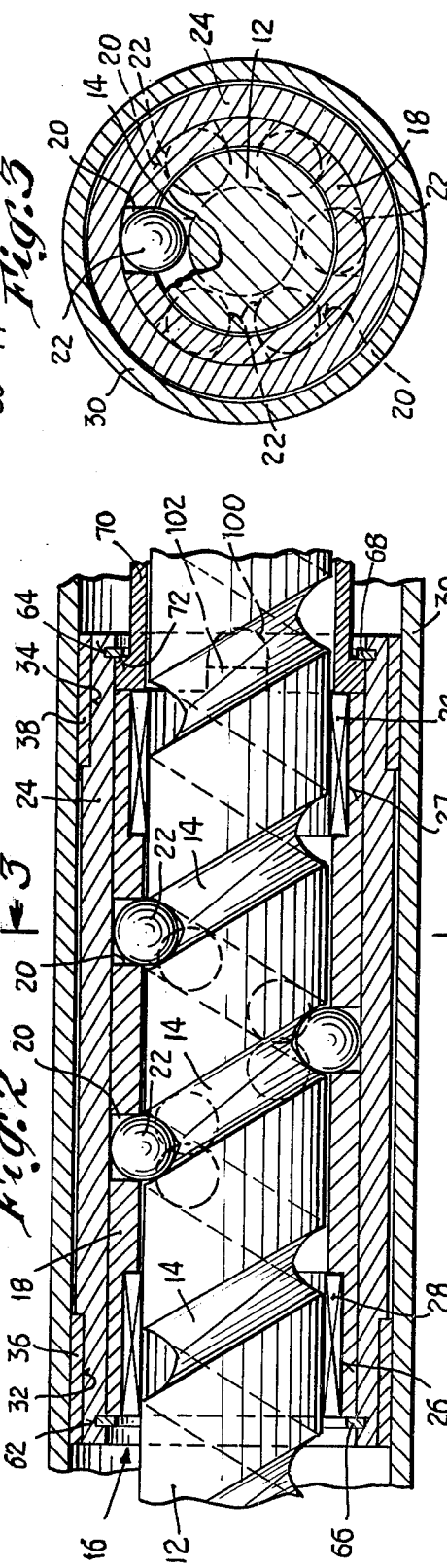
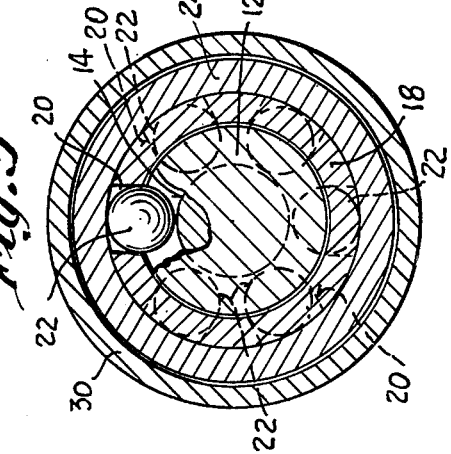
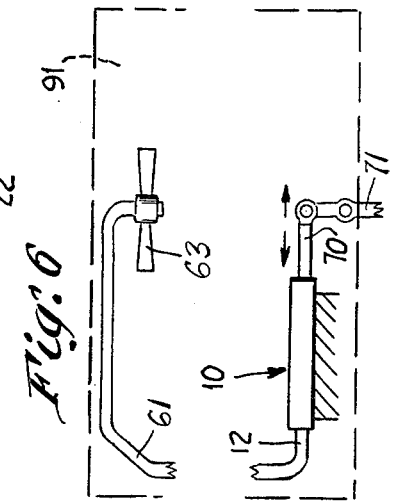
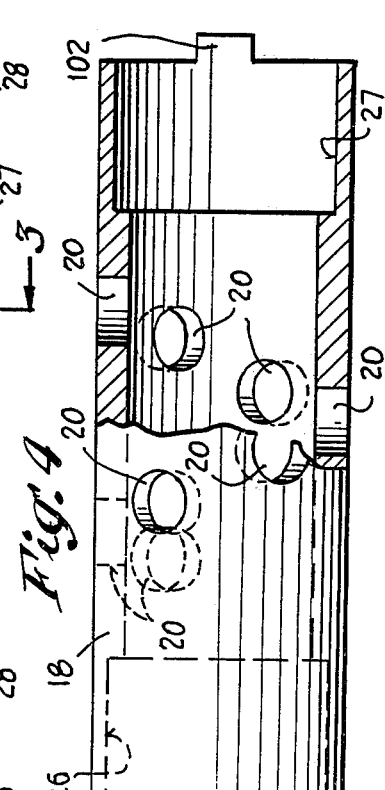
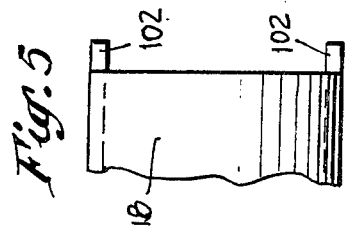

U.S. Patent   Apr. 29, 1980   Sheet 2 of 2   4,199,999
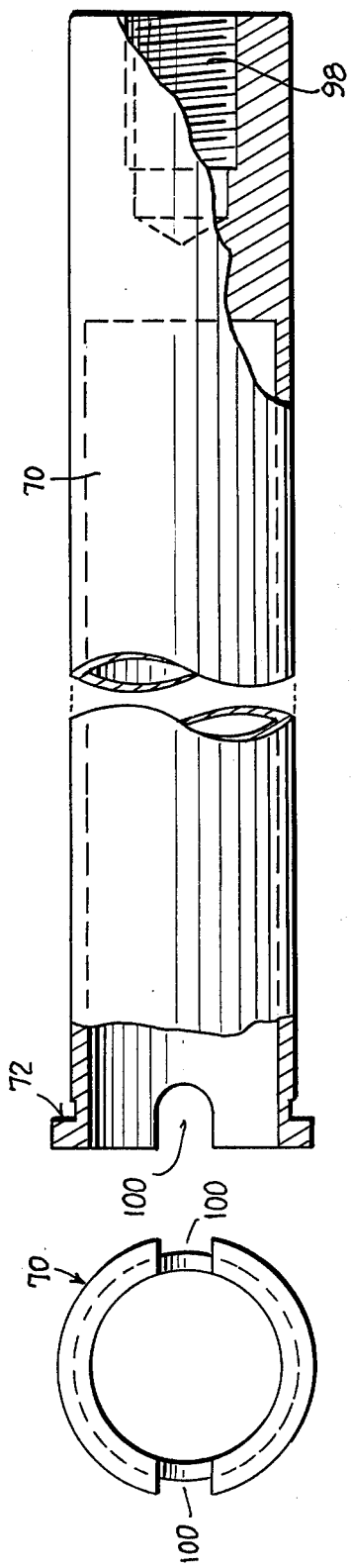
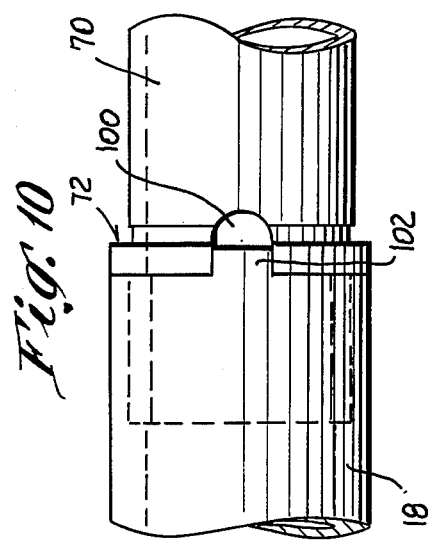
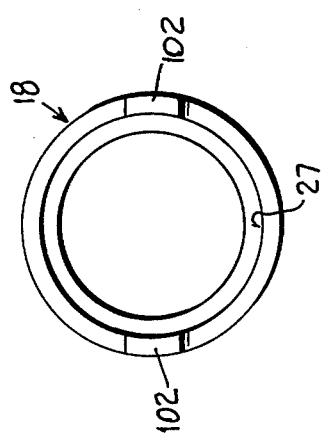

BALL-TYPE MECHANICAL TRANSMISSION

BACKGROUND

This invention relates generally to light-load actuators for converting rotary motion to linear motion, as in boat steering mechanisms and the like and more particularly to devices of this type which utilize ball elements to reduce the friction and improve the overall drive efficiency.

In the past a number of different types of small, ball-type traverses or transmissions have been proposed and produced, meeting with varying degrees of success. A somewhat similar but heavy-duty prior arrangement is disclosed in U.S. Pat. No. 3,296,880, issued to Arthur M. Maroth on Jan. 10, 1967. The device described therein consists of a combination of screw and nut wherein the latter is provided with multiple roller elements, each having a tapered or conical body which is cooperable with the wall of the screw thread. The rollers are carried on suitable needle bearings, and as the nut rotates with respect to the screw, the rollers turn, thereby greatly increasing the efficiency of the transmission by substantially completely eliminating all sliding friction between the conical roller bodies and the screw threads. Under such circumstances, the friction between the rollers and the screw thread is of the rolling kind.

While the above device functioned in an acceptable manner, its efficient operation relied to a great extent on maintaining the proper dimensions and tolerances of both the roller elements and the thread formation. Such tolerances required precise machining in many cases, resulting in a device which generally worked well but was relatively expensive to produce. Moreover, due to the existence of the precision parts, the assembly of the device was somewhat complex and time-consuming. Also, care had to be exercised in order to insure that the multiple moving parts associated with the rollers, i.e. the components making up the bearings therefor, were adequately lubricated.

Yet another type of transmission, of lighter-duty rating, is disclosed in U.S. Pat. No. 4,031,765 issued to Joseph R. Metz on June 28, 1977. The device illustrated therein involves a reciprocating nut which is carried by a screw having a diamond-thread configuration. Multiple balls are carried by the nut and extend into the bore thereof, for engagement with the walls of the thread grooves. In this particular construction a series of springs is carried within the nut, selectively engageable with two of the balls, for holding each of the two in either of two oppositely-disposed extreme positions with respect to the nut. As the ends of the screw thread are reached by the balls, they are forcibly shifted by curved reversing grooves on the thread, so as to effect a reversal in the direction of movement of the nut. The above construction is much simpler and less costly, meeting with considerable commercial success. Its use, however, involves diamond-type screws which are more complex to machine and manufacture, resulting in a product which still has an appreciable overall cost that, while not so great as the cost of the roller-type transmission, was still prohibitive for many mass-market applications, as for example boat steering mechanisms, and other devices where small power is involved.

These prior devices all relied on a multiplicity of precision parts at the exact nucleus of the transmission, that is, where the engagement occurs between the relatively movable components which effect the change in motion. While precision balls are readily obtainable at fairly low cost, the related parts which engage and/or carry the balls involved precision forming, thereby obstructing efforts to effectively bring down costs to a commercially acceptable figure.

SUMMARY

The above drawbacks and disadvantages of prior rolling-friction transmissions of the kind mentioned, are obviated by the present invention which has for its main object the provision of an improved rotary-to-linear light-load mechanical transmission wherein the essential, movement-changing components are greatly reduced in number and capable of fabrication by ordinary, quick or easy production methods, thereby to effectively reduce the cost to a figure that is acceptable to the mass markets.

Another object of the invention is to provide an improved light-load rotary-to-linear mechanical transmission in accordance with the above, which is reliable in its operation and capable of having an extended service life.

Still another object of the invention is to provide an improved, light-load transmission as characterized, which is flexible in its application whereby it can be adapted to a wide variety of uses.

A feature of the invention resides in the provision of a mechanical transmission in accordance with the foregoing, which is relatively small and especially compact, enabling it to be accommodated in cramped or constricted spaces.

Another feature of the invention is the provision of an improved rotary-to-linear transmission of the type indicated, which provides a relatively high efficiency, even when handling moderate loads.

In accomplishing the foregoing there is provided, in one embodiment of the invention, a driver shaft having a rolled-in helical thread engaged by one or several balls which is or are carried in through-openings of a sleeve surrounding the shaft. A cylindrical jacket encircling the sleeve provides a back-up bearing surface for the balls and also constitutes a slide, having intermediary bearing means, within an outer housing. The latter further provides bearings for the shaft and for a link or connector part constituting the output of the transmission. With this arrangement, the various parts have multiple functions, thereby reducing the number of components required. At the same time, a desirable simplicity is had, and ultra-precise machining operations are eliminated.

Still other features and advantages will hereinafter appear.

In the accompanying drawings:

FIG. 1 is an axial sectional view of the rotary-to-linear transmission of the invention.

FIG. 2 is a fragmentary axial section, enlarged, to reveal further details.

FIG. 3 is a transverse section, taken on the line 3—3 of FIG. 2.

FIG. 4 is a detail of a cage or sleeve member of the transmission.

FIG. 5 is a fragmentary side elevational view of the right end portion of the sleeve member, rotated 90 degrees.

FIG. 6 is a diagrammatic illustration showing the use of the transmission of the present invention in a boat steering mechanism.

FIG. 7 is a view partly in side elevation and partly in axial section, of the link or connector member of the transmission.

FIG. 8 is a left elevational view of the link of FIG. 7.

FIG. 9 is a right end elevational view of the sleeve member of the transmission, and FIG. 10 is a fragmentary side elevational view of the interlocking connection between the sleeve member and the link.

Referring first to FIGS. 1 and 5, the transmission of the present invention, designated generally by the numeral 10, comprises an elongate screw shaft 12 having a thread formation defining an essentially helical groove 14 of generally rounded configuration, and a two-part follower nut 16. The groove 14 of the shaft 12 can be advantageously formed by a quick rolling operation, as distinguished from the precise machining operation heretofore utilized in ball-type traverses. The nut 16, in accordance with the invention, includes an inner sleeve part 18 which has multiple radially extending through-slots or openings 20 constituting sockets for thread-engaging ball elements 22. It will be seen that the openings 20 extend between the inner and the outer surfaces of the sleeve 18 whereby they can be easily formed by a drilling and reaming operation. In the present instance the transmission is shown as having eight of the ball elements 22, but other arrangements involving either fewer or else greater numbers of ball elements could readily be employed.

Encircling the sleeve 18 is a cylindrical jacket 24 whose bore has a hardened surface which fits the sleeve snugly, and which provides a simple and reliable backup or outer bearing for the ball elements 22 such that they are all caused to occupy radially similar positions. This is an important feature of the invention, since in an extremely simple manner it insures that the ball elements are properly radially positioned in the nut, resulting in an even distribution of load over all their diameters when the transmission is in operation, using a simple, easily-fabricated component.

As shown, the sleeve 18 is provided with annular internal recesses 26, 27 at its ends, in which there are received suitable centralizing slide bearings 28 that may be constituted of either plastic, bronze, or other bearing material. The bearings 28 engage relatively broad cylindrical surfaces of the screw shaft, and prevent canting of the nut 16 as it traverses the length of the screw. Such bearings are preferably pressed in place in the sleeve 18.

As also illustrated in FIG. 1, in accordance with the invention, both the nut 16 and the screw shaft 12 are disposed within a tubular housing 30, together with the jacket 24 which latter is provided with annular exterior recesses 32, 34 at its ends, that carry additonal bearings 36, 38. The bearings 36, 38 are slidably engageable with the inner surface of the housing 30, and maintain the exterior surface of the jacket 24 in spaced relation therewith, as shown. They are preferably constituted of a plastic substance, such as Delrin, and can be secured in the recesses 32, 34 by a suitable adhesive or cement.

Disposed at one end of the housing 30 and secured in the bore thereof is a bearing block for the screw shaft, generally designated 40. The bearing block 40 is releasably held in place at its opposite ends by snap retainer rings 42, 44 which are received in annular grooves in the inner surface of the housing 30. Also located at the opposite ends of the block 40 are thrust washers 46, 48 one of which engages a shoulder 50 on the screw shaft 12 and the other of which is engaged by a resilient, bowed spring retainer ring 52 that is carried in an annular groove 54 in the shaft 12, the groove 54 being spaced from the shoulder 50 a distance equal to the length of the block 40, as shown. The block 40 further has a recess 56, and a portion of the housing 30 is preferably dimpled as at 58, so as to more securely retain the block 40 and to prevent rotation thereof within the housing.

A sealing gasket or O-ring 60 is also provided, carried in an annular groove in the block 40 and sealingly engaging the inner surface of the housing 30 to prevent leakage of moisture in the area between the two parts. The left end of the screw shaft 12 is adapted to be connected to a suitable driving source, such as a flexible shaft 61 from a boat steering wheel (FIG. 6).

Referring again to FIG. 1, both ends of the jacket 24 extend a short distance past the adjacent ends of the sleeve 18, respectively. Two internal grooves 62, 64 are provided in the jacket 24, carrying locking rings 66, 68. The ring 66 directly engages one end of the sleeve, as shown. At the opposite end of the sleeve 18 there is a tubular connector or link member 70 which constitutes the output of the transmission and projects through an open end of the housing 30, such link receiving driving power from the nut 16. In accomplishing this, the connector or link member has an annular shoulder 72 which is engaged by the locking ring 68. The shoulder 72 is disposed within the jacket 30, and the inner end of the connector member 70 abuts the sleeve 18 and one of the slide bearings 28.

An additional bearing block is provided in the housing 30, constituting a guide for the connector member 70. This block is indicated by the numeral 74, and is releasably secured in the housing by retainer rings 76, 78 which are carried in internal grooves 80, 82 respectively of the housing. Sealing means are provided between the housing 30 and the bearing block 74, in the form of an O-ring 84 carried in an annular groove of the block and sealingly engaging the inner surface of the housing. An additional gasket 86 of generally square cross section is carried in an internal groove of the block 74 and sealingly engages the outer surface of the connector member 70. As an additional barrier against debris or moisture, a scraper device 88 is provided at the end of the housing 30, having a resilient conical scraping surface 90 the axis of which is substantially aligned with that of the connector member 70. The particular configuration of the scraper tends to trap any debris on the surface of the connector member as the latter is being retracted into the housing 30, as can be readily understood. The scraper is secured in a shallow annular recess 92 in the inner surface of the housing 30, by suitable adhesive or cement.

Whereas the simplified and improved transmission 10 of the present invention has uses in a variety of environments, it is particularly well suited for use in a boat steering mechanism as shown in FIG. 6. Here the flexible shaft 61 which is turned by the wheel 63 is connected to the transmission shaft 12. The output link or member 70 of the transmission is connected to the tiller 71 of the boat. Opposite turning movements of the wheel 63 and shafts 61 and 12 effect reciprocation of the link 70 and tiller 71, as can now be understood.

In accordance with the present invention, simple means are provided for interlocking the link 70 and the sleeve 18 so as to prevent turning movement of the latter. It will be understood that the link 70 itself is held from turning by means of its connection to the tiller 71, via a screw 96 which is threaded into a bore 98 of the link.

Referring to FIGS. 4-10, the link 70 has a pair of diametrically opposite notches 100 at its inner end, adapted to receive lugs 102 of the sleeve 18. There is, in effect, an interlocking joint between the sleeve 18 and the link 70, by which the sleeve is held from turning with respect to the link. Thus, the reactive forces on the sleeve 18 due to the turning movements of the shaft 12 will not result in the sleeve turning, but instead the latter will be forced to reciprocate along with the jacket 24 and link 70.

It will now be seen from the foregoing that I have provided an especially simple and unique, light-load rotary-to-linear transmission which has relatively few components at the place where the motion interaction occurs, said components at the same time being capable of manufacture by ordinary machining operations which do not necessitate ultra-precision work. The transmission is thus low in cost and suitable for mass-market use. Moreover, it is relatively small and compact, and readily adaptable to a large variety of uses.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention.

I claim:

1. A light-load mechanical actuator device for applying reciprocating forces to a machine part, comprising in combination:
   (a) an elongate screw shaft having a helical thread characterized by a rounded bottom trough,
   (b) a shaft-engaging ball disposed in said thread,
   (c) a sleeve encircling said screw shaft, having an opening constituting a socket extending between its inner and outer walls and in which the ball is received, said sleeve having spaced-apart portions and internal annular slide bearings carried by said portions and engaging the screw shaft,
   (d) a substantially cylindrical jacket encircling and closely fitting said sleeve and having its bore engaged with and providing a back-up surface for said ball, said jacket extending beyond the ends of the sleeve,
   (e) locking rings disposed in the bore of the jacket, one of said rings engaging one end of the sleeve,
   (f) a tubular connector member in which the shaft is received, said connector member having a shouldered extremity disposed within said jacket and engaged by the other locking ring,
   (g) anti-friction slide bearings carried exteriorly at the ends of said jacket, and
   (h) a tubular housing surrounding said jacket and having its bore engaged by said anti-friction bearings, said anti-friction bearings enabling sliding movement of the sleeve and jacket to occur within the housing as the screw shaft is rotatably driven.

2. The invention as defined in claim 1, wherein:
   (a) the shouldered extremity of the connector member engages the other end of said sleeve.

3. The invention as defined in claim 1, wherein:
   (a) the inside diameter of the tubular connector member closely slidably fits the crest diameter of the screw shaft to minimize looseness of the latter as it is telescopically received in the member during reciprocation of the sleeve and jacket in the housing.

4. The invention as defined in claim 1, and further including:
   (a) a bearing block disposed near one end of the housing and carried in the bore thereof,
   (b) said bearing block being slidably engaged by said connector member as the sleeve and jacket reciprocate within the housing.

5. The invention as defined in claim 4, wherein:
   (a) said bearing block has an annular internal groove, and
   (b) a sealing gasket carried in said groove and engageable with the connector member, to provide a seal against fluids.

6. The invention as defined in claim 1, and further including:
   (a) a bearing block disposed near one end of the housing and carried in the bore thereof, and
   (b) snap retainer means for releasably securing the block in the housing.

7. The invention as defined in claim 6, and further including:
   (a) resilient sealing means disposed between said bearing block and said housing, providing a moisture barrier between said two parts.

8. The invention as defined in claim 1, and further including:
   (a) a resilient annular scraper member carried by the housing near one end and engageable with the surface of the connector member, for intercepting moisture and debris as the connector member is retracted into the housing.

9. The invention as defined in claim 8, wherein:
   (a) said scraper member comprises a conical shell providing a conical scraping surface angularly disposed with respect to the axis of the connector member.

10. The invention as defined in claim 1, and further including:
    (a) cooperable means on said sleeve and connector member, preventing relative turning therebetween.

11. A light-load mechanical transmission for converting rotary to linear motion, comprising in combination:
    (a) an elongate screw shaft having a generally helical thread groove,
    (b) a nut having a through bore to receive the screw,
    (c) a ball-driving element carried by the nut and engageable with the walls of the thread groove,
    (d) a pair of substantially annular, cylindrical anti-friction slide bearings carried in the bore of the nut and disposed at spaced-apart locations therein and on opposite sides of the ball-driving element, for sliding engagement with the screw shaft,
    (e) a tubular housing having an inner wall surface, said housing substantially completely enclosing the nut,
    (f) an annular outer slide bearing separate and distinct from, and carried by the nut, and disposed between the latter and the inner wall surface of the housing and engaging said wall surface, to enable low-resistance sliding movement to occur between the nut and the housing, and
    (g) bearing means carried by said housing and engageable with the screw shaft for maintaining the latter substantially centralized with respect to the housing as the nut moves with respect thereto.

12. The invention as defined in claim 11, and further including:
(a) retainer means associated with said bearing means for limiting relative axial movement between the screw shaft and the housing.

13. A light-load mechanical transmission for converting rotary to linear motion, comprising in combination:
(a) an elongate screw shaft having a generally helical thread groove,
(b) a nut having a through bore to receive the screw,
(c) a ball driving element carried by the nut and engageable with the walls of the thread groove,
(d) anti-friction slide bearings carried in the bore of the nut and disposed at spaced-apart locations therein, for sliding engagement with the screw shaft,
(e) a tubular housing having an inner wall surface, said housing substantially completely enclosing the nut,
(f) an annular slide bearing disposed between the nut and the inner wall surface of the housing to enable low-resistance sliding movement to occur between the nut and the housing,
(g) bearing means carried by said housing and engageable with the screw shaft for maintaining the latter substantially centralized with respect to the housing as the nut moves with respect thereto,
(h) a tubular connector member telescopically receivable in said housing and having a portion projecting through an open end thereof, and
(i) means for securing said connector member to the nut such that force from the latter is transmitted to the connector member for performing useful work.

14. The invention as defined in claim 13, and further including:
(a) additional bearing means carried by said housing and engageable with said connector member for maintaining the latter substantially centralized with respect to the housing.

15. The invention as defined in claim 14, wherein:
(a) said additional bearing means comprises a bearing block,
(b) said housing having a pair of spaced-apart annular grooves on its inner wall surface adjacent the location of said additional bearing means, and
(c) a pair of spring retainer rings carried in said grooves respectively and engageable with said additional bearing means, to thereby hold the latter against axial shifting within the housing.

16. The invention as defined in claim 14, wherein:
(a) said additional bearing means comprises a bearing block,
(b) a sealing gasket disposed between and engaging said bearing block and the inner wall surface of the housing, to provide a seal against leakage between said two parts.

17. The invention as defined in claim 14, wherein:
(a) said additional bearing means comprises a bearing block, and
(b) a sealing gasket disposed between and engaging said bearing block and said connector member, to provide a seal against leakage between the two parts.

18. A light-load mechanical transmission for converting rotary to linear motion, comprising in combination:
(a) an elongate screw shaft having a generally helical thread groove,
(b) a nut having a through bore to receive the screw,
(c) a ball driving element carried by the nut and engageable with the walls of the thread groove,
(d) anti-friction slide bearings carried in the bore of the nut and disposed at spaced-apart locations therein, for sliding engagement with the screw shaft,
(e) a tubular housing having an inner wall surface, said housing substantially completely enclosing the nut,
(f) an annular slide bearing disposed between the nut and the inner wall surface of the housing to enable low-resistance sliding movement to occur between the nut and the housing,
(g) bearing means carried by said housing and engageable with the screw shaft for maintaining the latter substantially centralized with respect to the housing as the nut moves with respect thereto,
(h) retainer means associated with said bearing means for limiting relative axial movement between the screw shaft and the housing,
(i) said screw shaft having an annular groove, and an annular shoulder spaced therefrom,
(j) said retainer means comprising a bowed spring washer disposed in said groove and biasing said shoulder into engagement with said bearing means, for eliminating looseness between the latter and the screw shaft.

19. The invention as defined in claim 18, wherein:
(a) said bearing means comprises an annular bearing block, and
(b) a pair of thrust washers disposed on opposite ends of said block and engaged respectively by said bowed spring washer and said shoulder.

20. A light-load mechanical actuator device for applying reciprocating forces to a machine part, comprising in combination:
(a) an elongate screw shaft having a helical thread characterized by a rounded bottom trough,
(b) a shaft-engaging ball disposed in said thread,
(c) a sleeve encircling said screw shaft, having an opening constituting a socket extending between its inner and outer walls and in which the ball is received, said sleeve having spaced-apart portions and internal annular slide bearings carried by said portions and engaging the screw shaft,
(d) a tubular connector member disposed in alignment with said sleeve,
(e) cooperable means on said sleeve and connector member, preventing relative turning therebetween, and
(f) means securing adjoining ends of the sleeve and connector member against separation.

21. The invention as defined in claim 20, wherein:
(a) said cooperable means comprises an interlocking connection.

22. The invention as defined in claim 21, wherein:
(a) said interlocking connection comprises a recess-and-lug formation on the sleeve and connector member.

23. A light-load mechanical transmission for convertion rotary to linear motion, comprising in combination:
(a) an elongate screw shaft having a generally helical thread groove,
(b) a nut having a through bore to receive the screw, (c) a ball driving element carried by the nut and engageable with the walls of the thread groove,
(d) anti-friction slide bearings carried in the bore of the nut and disposed at spaced-apart locations therein, for sliding engagement with the screw shaft,
(e) a tubular housing having an inner wall surface, said housing substantially completely enclosing the nut,
(f) an annular slide bearing disposed between the nut and the inner wall surface of the housing to enable low-resistance sliding movement to occur between the nut and the housing,
(g) bearing means carried by said housing and engageable with the screw shaft for maintaining the latter substantially centralized with respect to the housing as the nut moves with respect thereto,
(h) said bearing means comprising an annular bearing block,
(i) said housing having a pair of spaced-apart annular grooves on its inner wall surface, and
(j) a pair of spring retainer rings carried in said grooves respectively and engageable with said bearing block to thereby hold the latter against axial shifting within the housing.

24. A light-load mechanical transmission for converting rotary to linear motion, comprising in combination:
(a) an elongate screw shaft having a generally helical thread groove,
(b) a nut having a through bore to receive the screw,
(c) a ball driving element carried by the nut and engageable with the walls of the thread groove,
(d) anti-friction slide bearings carried in the bore of the nut and disposed at spaced-apart locations therein, for sliding engagement with the screw shaft,
(e) a tubular housing having an inner wall surface, said housing substantially completely enclosing the nut,
(f) an annular slide bearing disposed between the nut and the inner wall surface of the housing to enable low-resistance sliding movement to occur between the nut and the housing,
(g) bearing means carried by said housing and engageable with the screw shaft for maintaining the latter substantially centralized with respect to the housing as the nut moves with respect thereto,
(h) said bearing means comprising an annular bearing block, and
(i) means on said block defining a depression,
(j) said housing being displaced at the location of said depression so as to thereby hold captive the block and prevent turning movement thereof.

* * * * *